July 9, 1968

W. LINNERZ ETAL 3,391,566

EXTRUSION PRESSES

Filed July 29, 1965

Inventors
WILHELM LINNERZ
HELMUT GOLLER
BY
ATTORNEY

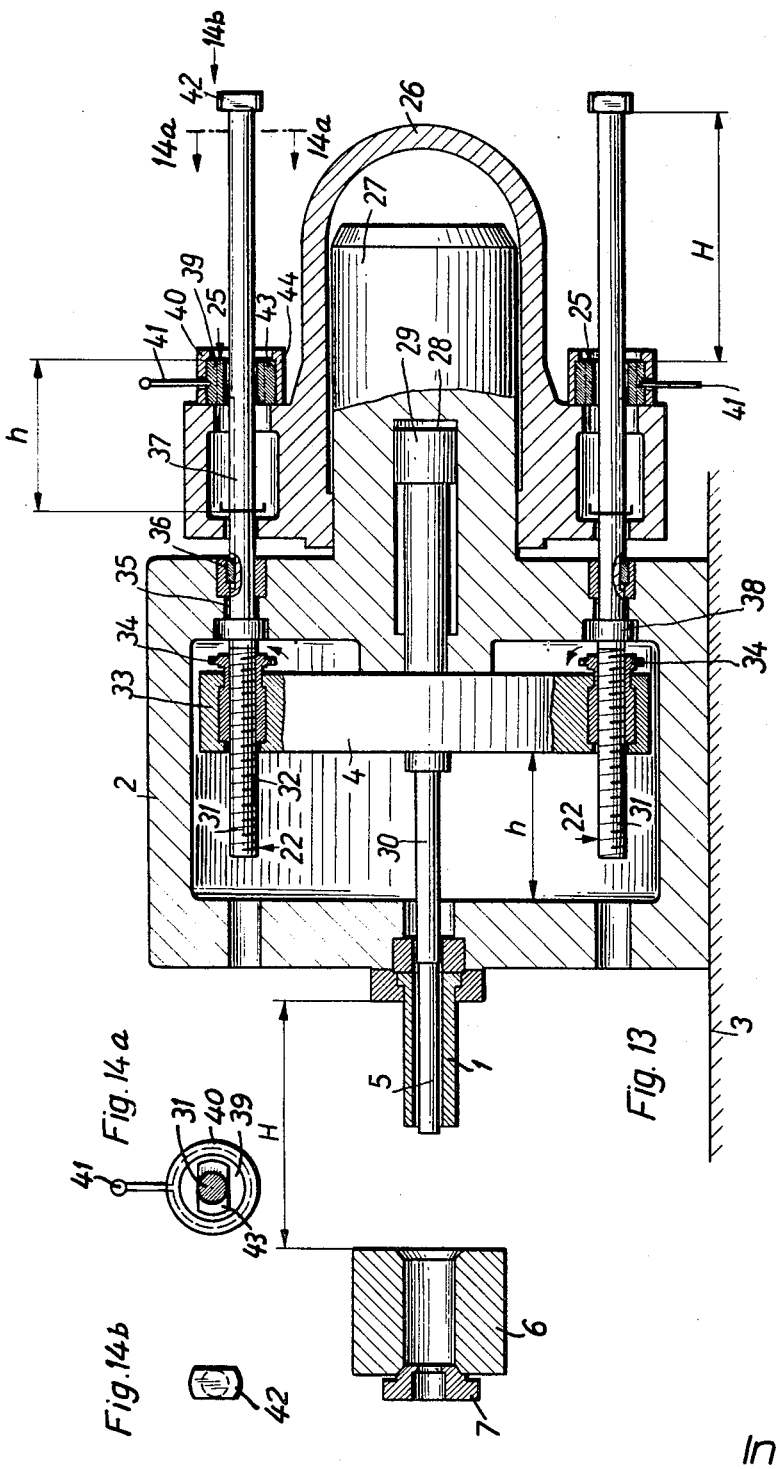

July 9, 1968 W. LINNERZ ETAL 3,391,566
EXTRUSION PRESSES
Filed July 29, 1965 4 Sheets-Sheet 4

Inventors
WILHELM LINNERZ
HELMUT GOLLER
BY
ATTORNEY

United States Patent Office
3,391,566
Patented July 9, 1968

3,391,566
EXTRUSION PRESSES
Wilhelm Linnerz, Buttgen, near Neuss, and Helmut Goller, Dusseldorf, Germany, assignors to Lindemann Maschinenfabrik G.m.b.H., Dusseldorf, Germany
Filed July 29, 1965, Ser. No. 475,760
Claims priority, application Germany, Aug. 7, 1964, L 48,486
3 Claims. (Cl. 72—265)

ABSTRACT OF THE DISCLOSURE

An extrusion press for the alternate manufacture of tubular bodies and of rods comprising a ram body with hollow extrusion stem and a cross head with mandrel rod passing through said stem in which each control rod checks not only the cross head to limit the movement of the mandrel rod but also adjusts the position of the cross head relative to the ram body.

---

Our invention relates to extrusion presses selectively usable for the manufacture of rods and of tubular bodies. Such presses comprise pressing means and piercing means adjustable for either of said manufacturing operations. When rods are to be manufactured, the piercing means have to remain unobstructed and allowed to follow the full stroke of the pressing means. When tubular bodies are to be manufactured the piercing means have to be arrested while the pressing means complete their stroke. These adjustments have to be carefully made as otherwise damage to the press results.

It is an object of our invention to provide an extrusion press of the beforesaid type which avoids any risk of breakage and may be safely operated with either unobstructed or arrestable piercing means for the manufacture of rods and tubular bodies, respectively.

In presently known presses of said type a tubular press ram is attached to a reciprocable ram head housing a slide or carriage which is reciprocable therein and which supports and actuates a piercing or mandrel rod longitudinally passing through said tubular press ram; adjustable positioning means cooperating with the ram head control the initial position of said carriage therein, and adjustable check means associated with said carriage and cooperating with a limit stop govern the end position of the piercing or mandrel rod in the press ram when the latter is required to continue its extruding operation. According to our invention we substitute said separate positioning means and check means by a single control means which cooperates on one hand with the ram head and on the other hand with a stationary limit stop which can be moved into an inoperative position. Thus only a single simplified adjusting operation will be required and a possible misadjustment will not result in a damage to the press.

In a preferred embodiment of our invention the single control means comprises at least one screw or threaded spindle which engages the said carriage to position the same relative to the ram head and which cooperates with a temporarily disengageable stationary limit stop to permit independent forward travel of the press ram.

The principles of our invention are applicable not only to extrusion presses wherein the ram head houses the said carriage but also to such presses wherein the carriage is located beyond the ram head.

In the drawing:

FIGS. 1 to 6, which are included just to better explain the advantages of our invention, show diagrammatically longitudinal sectional views of hitherto conventional positioning and check means for the piercing or mandrel rod in six phases during a working cycle.

FIG. 7 shows an enlarged longitudinal partial sectional view of the billet container and of a particular embodiment of the operational end of the mandrel rod, FIGS. 8 to 12 show diagrammatically longitudinal sectional views of our new single control means for the mandrel in five phases during a working cycle, FIG. 13 shows a longitudinal sectional view of one embodiment of our new extrusion press, FIG. 14a is a cross sectional view on line 14a—14a of FIG. 13;

FIG. 14b is a detail thereof seen in direction of arrow 14b of FIG. 13, and

The same reference numerals indicate the same or equivalent elements in all figures.

Figure 15:
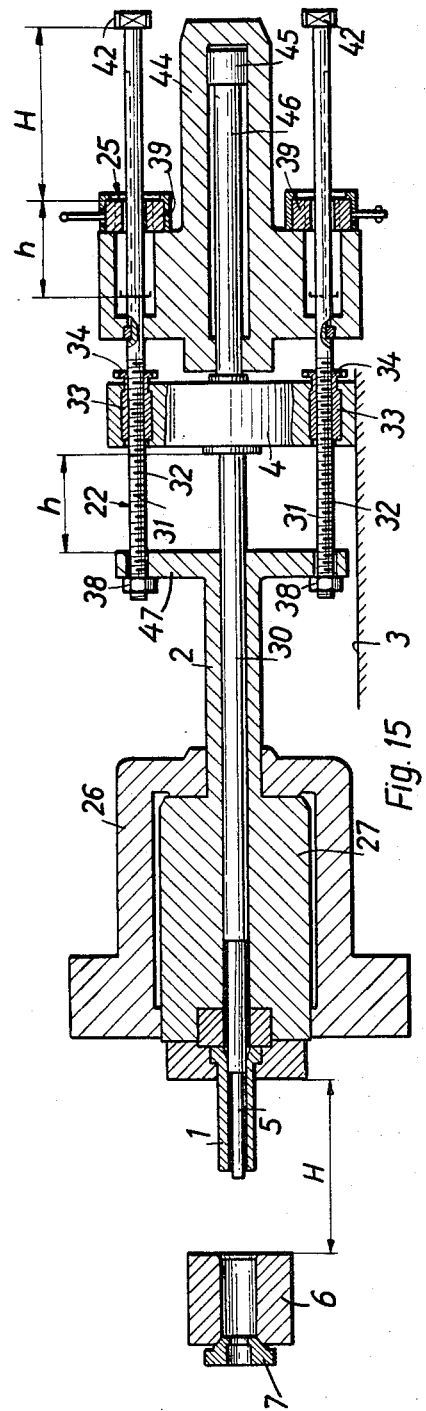
FIG. 15 is a longitudinal sectional view of another embodiment of our new extrusion press.

FIGS. 1 to 6 as well as FIGS. 8 to 12 illustrate diagrammatically just those parts of the extrusion press which are necessary to an understanding of the principles of our invention. Additionally said figures are simplified in certain respects. Thus the hydraulic drive means for the ram and its head 2 and for the carriage or crosshead 4 actuating the mandrel rod 5 are not shown, only the actuating forces being indicated by arrows 19 and 20, respectively, and neither is the stationary pressplate supporting the billet container 6 illustrated. Further the mandrel rod and the proper mandrel are shown as a unit 5, and it is disregarded that the billet or box 8 is upset before being pierced. While FIGS. 1–6 diagrammatically illustrate prior art FIGS. 8 to 12 indicate the principles of our invention applied to a press comprising a carriage or cross-head 4 conventionally housed in a ram head 2 as constructively shown in FIG. 13. However, the same principles may be applied to a press wherein a cross-head or carriage member 4 moves outside the ram head 2 as illustrated in FIG. 15. Whenever hereinafter the descriptions "front" or "forward" or "rear" or "rearward" are used, they have to be understood in relation to the direction of the press stroke.

In the diagrammatic showing of FIGS. 1 to 6 explaining the operation of presently known presses the tubular extrusion stem 1 projects from the front face 9 of the ram head 2 which moves on the stationary guide track 3. Within said ram head 2 is a reciprocable carriage or slide cross-head 4 which holds and actuates the piercing rod or mandrel 5. The billet or box container 6 is located in operational relation in front of the extrusion stem 1 and whose stroke H identical with the stroke of the press ram is limited when the faces 9 and 10 of the ram head 2 and of the container 6 contact.

The mandrel or piercing rod 5, which may be exchangeable, is conventionally made as short as possible. Prior to its piercing action it is adjusted from the position shown in FIG. 1 into the operational initial position exaggeratedly shown in FIG. 2 wherein its operational end 11 projects by a certain distance $d$ beyond the front face 12 of stem 1. Such adjustment is effected by a positioning screw 13 which engages and, can unobstructedly advance the carriage 4 relative to the ram head 2, and which bears with it rear end at 14 against a back portion 15 of the ram head. The operational initial position of carriage 4 shown in FIG. 2 thus depends of the length of the momentarily applied piercing rod or mandrel 5; the momentary location of the carriage 4 within the ram head 2 can be easily judged from the size of said projecting mandrel portion $d$.

The carriage or cross-head 4 is engaged by a second screw 16 which in its longitudinal displacements in either direction is not obstructed by the ram head 2. This second screw 16 may be described as a check screw to control the displacement of the carriage member 4 relative to the ram head 2 and thus the operational stroke of mandrel or piercing rod 5.

Figure 1:
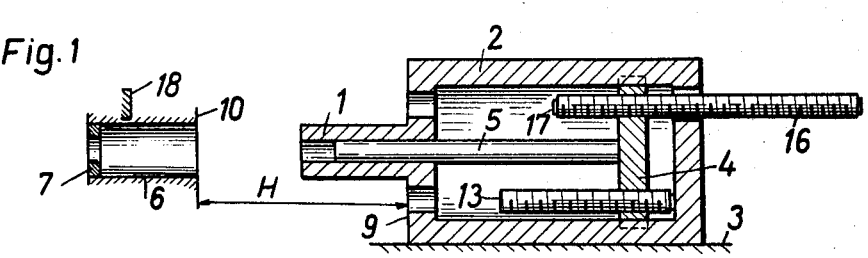

As shown in FIG. 1 the check screw 16 is turned rearwardly far out of the carriage or cross-head 4 so that its forward end 17 is prevented from ever reaching the stationary limit stop 18, thereby keeping the check screw inoperative and causing the press to operate with an unobstructedly moving mandrel rod 5. However, if the press is intended to extrude tubular bodies operating with an arrestable piercing rod 5, then the screw 16 is advanced into the position shown in FIGS. 2 to 5, in which its forward end 17 may contact the stationary limit stop 18 thereby determining the end position of the piercing rod 5. However, experience showed that the proper degree of adjustment of the check screw 16 is not readily determinable and is easily misjudged. It has been assumed that FIGS. 2 to 5 show a correct adjustment.

Figure 2:
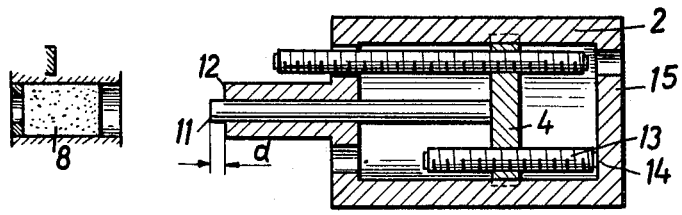
Figure 3:
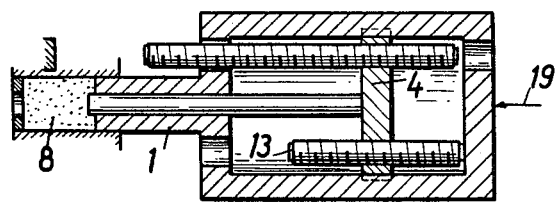
Figure 4:
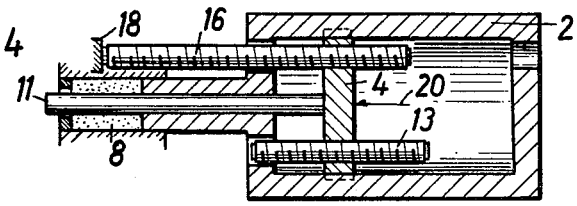
Figure 5:
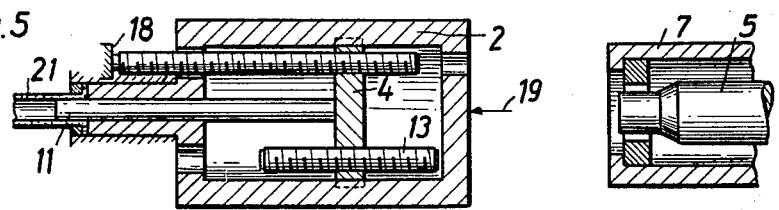

After positioning screw 13 and check screw 16 have been adjusted as shown in FIG. 2, the ram head 2 is moved by a force 19 exerted by its not shown hydraulic drive means into the position shown in FIG. 3 thereby causing the extrusion stem 1 to act upon the billet 8 within container 6. Thereupon a punching force 20 exerted upon the cross piece or carriage 4 by its own hydraulic actuating means (not shown) moves the carriage 4 with the mandrel rod 5 into the position shown in FIG. 4 so that the billet 8 is pierced. In this position the check screw 16 strikes and is arrested by the limit stop thereby terminating the forward movement of carriage 4 with piercing rod 5 which entered the matrix 7 with its operational end. Now the said force 19 is again permitted to act upon the ram head 2 moving the same forwards into the position shown in FIG. 5, so that the billet is pressed as tube 21 out of the matrix 7 over the operational end 11 of the arrested piercing rod 5.

Figure 7:
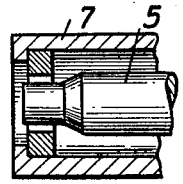
Figure 6:
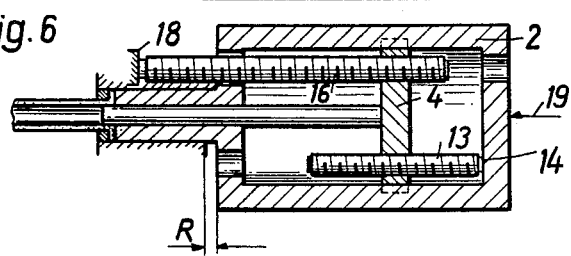

FIG. 6 illustrates the result of an incorrect adjustment of the check screw 16 the same having been advanced in the carriage 4 more than required towards the limit stop 18. In such case the check screw 16 will strike the limit stop 18 before the faces 9 and 10 of the ram head 2 and of the container 6, respectively, contact leaving a residual stroke R for the ram head. If this remains unnoticed, as it often will, the ram head 2 will continue to advance under force 19 and machine fractures will result. Conversely, if the check screw 16 is not advanced far enough, then the operating end 11 of the piercing rod 5 enters the matrix 7 too deeply. This again will cause machine fractures particularly if a piercing rod 5 is used which has a thinner operating end as shown in FIG. 7. Such piercing rods are now almost generally used in operations described above with reference to FIGS. 2 to 5.

The before described disadvantages are safely avoided in extrusion presses built in accordance with the principles of our invention as diagrammatically illustrated in FIGS. 8 to 12. Accordingly we replace the distinct positioning screw 13 and check screw 16 of FIGS. 1 to 5 by a single control element namely by control screw 22 which combines the functions of the positioning screw 13 and check screw 16. This control screw 22 bears with its rear end 23 against a rear part of the ram head 2 and serves like the positioning screw 13 to adjust the carriage 4 within or relative to the ram head 2 so that the operating end 11 of the piercing or mandrel rod 5 will project by a predetermined length $d$ beyond the front face 12 of extrusion stem 1. The frontal end 24 of screw 22 cooperates with a shoulder 25, the two being distanced from each other in the initial position shown in FIG. 8 in the same measure H' as the unchanging press stroke H.

Figure 8:
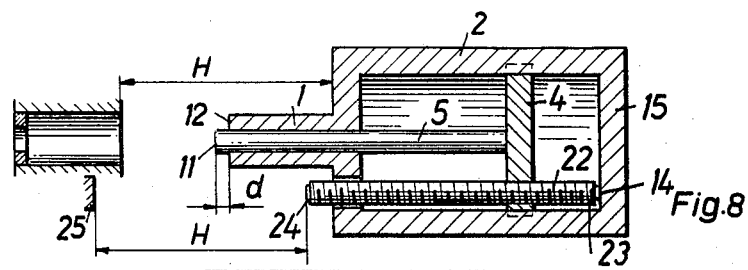
Figure 9:
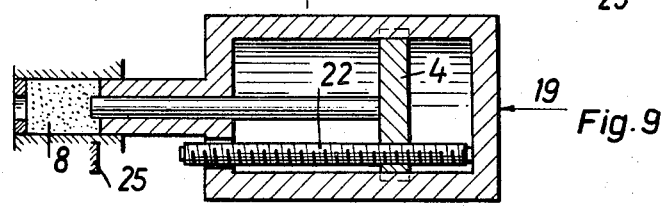
Figure 10:
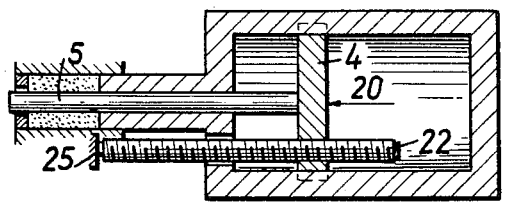
Figure 11:
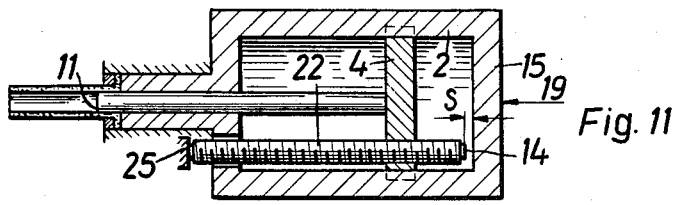

After the mandrel rod 5 held by carriage 4 has been correctly positioned by means of the controlling screw spindle 22 spindle 22 according to FIG. 8, the operation of the press proceeds as described with reference to FIGS. 2 to 5, except that no other adjustment corresponding to that of check screw 16 is required. Accordingly the succeeding operational positions of the machine parts shown in FIGS. 9, 10, 11 correspond to those shown in FIGS. 3, 4, 5, respectively. The undesired position shown in FIG. 6 cannot arise because the control screw 22, however adjusted, always moves forward by a distance H' equalling the unchangeable stroke H of the ram head 2 until it abuts the stationary shoulder or other stop member 25. In view thereof and considering the fact that the displacement required for piercing the billet 8 is somewhat greater than for pressing, a safeguarding interspace S will remain at the contacting rear end 14 of screw spindle 22. Neither can the operating end 11 of the mandrel penetrate too far into the matrix 7 because its position is solely determined by the initially adjusted projection $d$ (FIG. 8).

Figure 12:
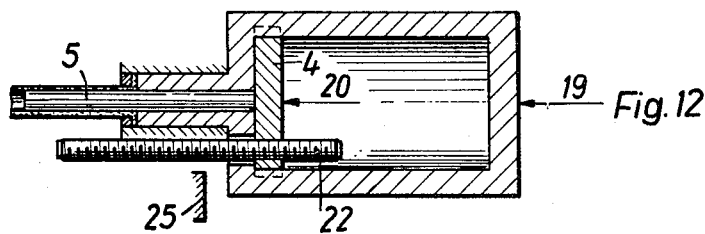

While FIGS. 8 to 11 illustrate the operation with arrestable mandrel rod 5 in the manufacture of tubular bodies, FIG. 12 illustrates the required adjustments for operation with unobstructed mandrel rod 5 in the manufacture of rods, the shoulder or other stop member 25 being in this case movable out of the path of the control spindle 22. The carriage member 4 can then move with the ram head 2 to the left from the position shown in FIG. 10, or can even additionally move relative to the ram head 2 in the direction of pressing so that the mandrel 5 leads the extrusion stem 1 as shown in FIG. 12.

FIGS. 13 and 15 illustrate two constructional embodiments of our invention in accordance with the principles explained above with reference to FIGS. 8 to 12.

FIG. 13 shows in a longitudinal sectional view a hydraulic extrusion press including a ram head 2 which holds the tubular extrusion stem 1 and houses the piercing device. The ram head 2 moves on the machine frame 3 and is hydraulically driven by its ram 27 operating in the stationary cylinder 26. In the ram 27 is a cylindrical boring 28 in which another ram 29 is hydraulically driven. This ram 29 is by its rod connected to the carriage member 4 which is reciprocable within the ram head 2 and which actuates the mandrel rod 30 with the mandrel 5 relative to the tubular extrusion stem 1.

The control member 22 is in this embodiment comprised of two parallel coordinated spindles 31 which extend rearwardly through bore holes 35 beyond the ram head 2 and are threaded at 32 on their forward portion housed in the ram head. These threaded spindle portions 32 pass through nuts 33 which are rotatably but in their axial direction unmovably held in the carriage member 4. Each nut 33 may be rotated by a gear wheel 34. If two or more spindles are used, the gear wheels 34 are coordinated and interconnected in known manner by a not shown mechanism so that they are always turned by the same amount and act as a uit like the single screw 22 in FIGS. 8 to 12. Keys 36 arranged in said bore holes 35 engage slots 37 longitudinally extending in the spindles 31 so that the same are secured against rotation. Each spindle 31 is further provided with a collar 38 which is sunk into the back portion 15 of the ram head 2 and serves as a prop means preventing the threaded portion 32 of the spindle to escape rearwardly through boring 35.

The stop means 25 of FIGS. 8 to 12 are in this embodiment formed by bayonet caps 39 which are rotatably but unmovably in axial direction mounted in a casing 40 and which may be turned by 90° by means of arms 41. Like the gear wheels 34 the arms 41 are so coordinated and interconnected by a not shown mechanism, that they are always identically set. The bayonet caps 39 cooperate with the hammer shaped spindle head 42 so that the same in one position (FIG. 14a) may pass therethrough whereas in a position turned by 90° (FIG. 14b) are stopped by the face 43 of the cap after traveling a distance H which conforms to the stroke H of the ram head 2. The operation of the press will be easily understood from the above description of FIGS. 8 to 12.

In the embodiment illustrated in FIG. 15 the carriage member 4 is separated from the ram head 2 which is actuated by a piston 27 operating in a stationary cylinder 26. The carriage member 4 is located rearwardly of the ram head 2 and is separately hydraulically driven by piston rod 46 and piston 45 moving in the stationary cylinder 44. The carriage member 4 actuates the rod 30 with mandrel 5 which project forwardly through the ram head 2, its piston 27 and the tubular press ram 1. The control member 22 of FIGS. 8 to 12 for adjusting the initial position of carriage member 4 relative to the ram head 2 and for determining its end position if working with arrestable piercing means in the extrusion of tubular bodies consists again of two correlated spindles 31 secured against rotation like those in FIG. 13. Their forward threaded portions 32 engage each a nut 33 which is rotatably, but secured against displacement in axial direction, mounted in the carriage member 4. The forward ends of the spindles 32 pass freely through borings in arms 47 of the ram head 2 and are secured by nuts or collars 38 against escaping rearwardly as in the embodiment shown in FIG. 13. The rear end of each spindle 32 is provided with a hammer shaped head 42 which cooperates with a bayonet cap 39 in the manner described with reference to the embodiment of FIG. 13. The operation of both embodiments is identical and conforms to the principles explained with regard to FIGS. 8 to 12.

While we have explained the principles of our invention and have shown and described two specific embodiments thereof, it will be understood that our invention may be otherwise embodied without departing from said principles and without avoiding the scope of our appended claims.

What we claim as our invention is:

1. In a hydraulic extrusion press for the manufacture of tubular bodies and of rods including a ram body having a given stroke; first hydraulic drive means for said ram body; a tubular extrusion stem forwardly projecting from the ram body; a cross head reciprocable in axial direction relative to the ram body; a mandrel rod forwardly projecting from the cross head through said tubular extrusion stem; and second hydraulic drive means for the cross head; the improvement comprising in combination at least one control rod associated with the ram body for longitudinal forward displacement therewith said control rod having a threaded frontal portion adjustably engaging the cross head to position the same relative to the ram body thereby defining its remaining stroke in agreement with the advance of the mandrel rod in the extrusion stem, and a rear portion for control of the forward movement of the adjustedly positioned cross head; a stationary gripping member and a therewith cooperating stop member on the rear portion of the control rod, said stop member in its starting position rearwardly distanced from the gripping member by an effective interstice equaling the stroke of the ram body, said gripping member adjustable to either arrest the advancing stop member with control rod and the thereby engaged cross head upon completion of said stroke, or to let the stop member with control rod and the engaged cross head finish their forward movement to effect the advance of the mandrel rod relative to the extrusion stem.

2. In a hydraulic extrusion press according to claim 1, a nut member rotatably mounted in the cross head, a non-rotatable control rod engaging said nut member with its threaded frontal portion, and means effecting the rotation of said nut member.

3. In a hydraulic extrusion press according to claim 2, a hammer shaped stop member and a rotationally adjustable bayonet cap forming said gripping means.

References Cited

UNITED STATES PATENTS

| | | | |
|---|---|---|---|
| 1,049,641 | 1/1913 | Astfalck | 72—264 |
| 2,903,130 | 9/1959 | Reichl | 72—264 |

CHARLES W. LANHAM, *Primary Examiner.*

K. C. DECKER, *Assistant Examiner.*